T. BROWN.
SUPPLY CART.
APPLICATION FILED JULY 28, 1915.

1,163,610.

Patented Dec. 7, 1915.
4 SHEETS—SHEET 1.

Witness:
Martin Peterson.

Inventor:
Theophilus Brown
by W. C. Johnston
his Attorney

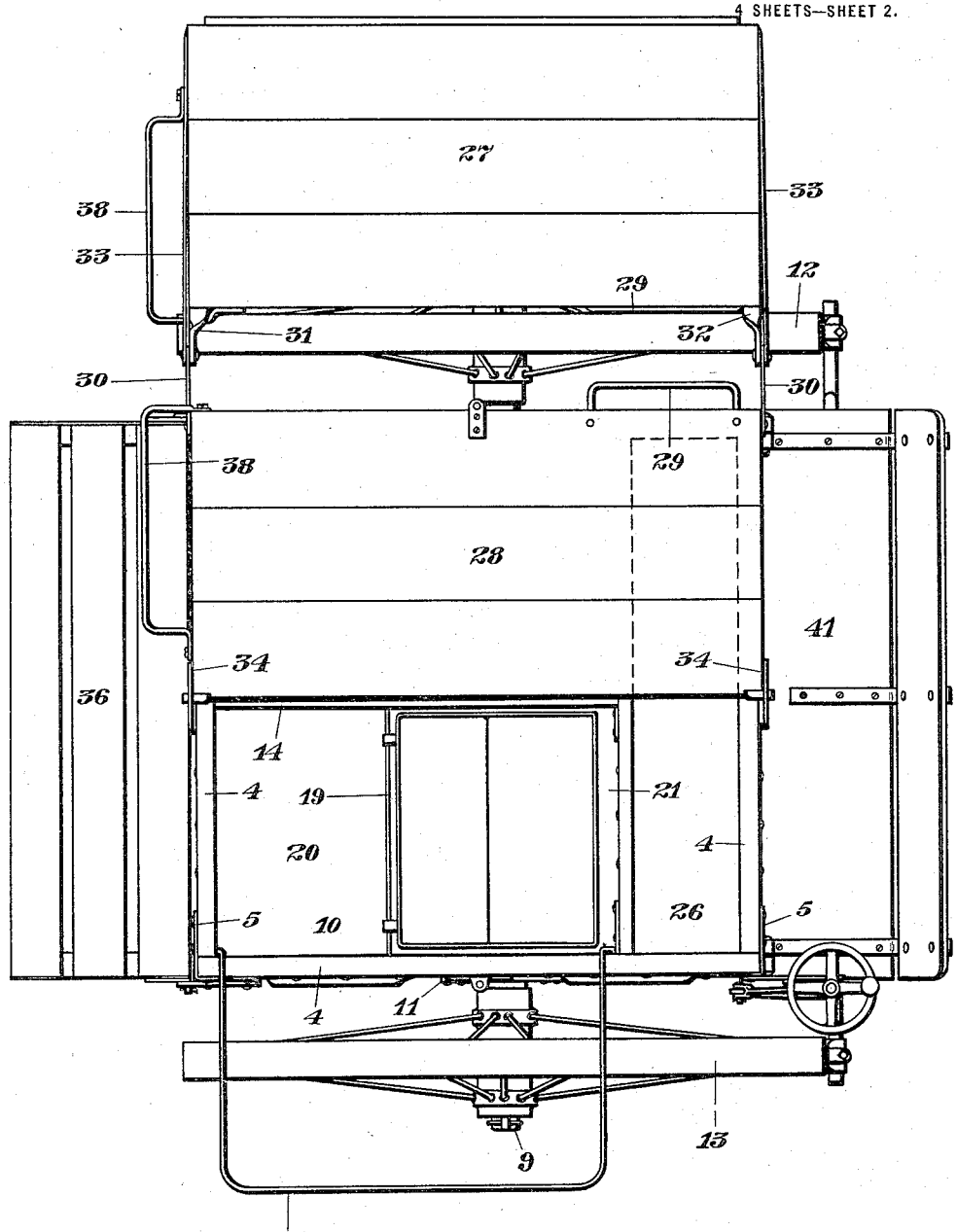

T. BROWN.
SUPPLY CART.
APPLICATION FILED JULY 28, 1915.
1,163,610.
Patented Dec. 7, 1915.
4 SHEETS—SHEET 3.
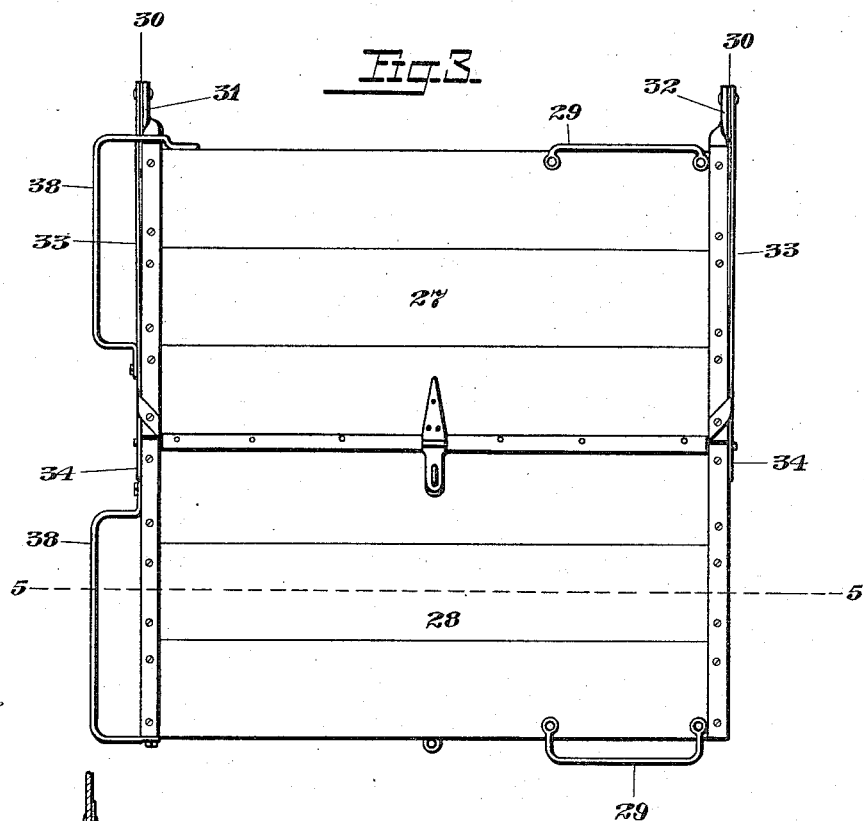
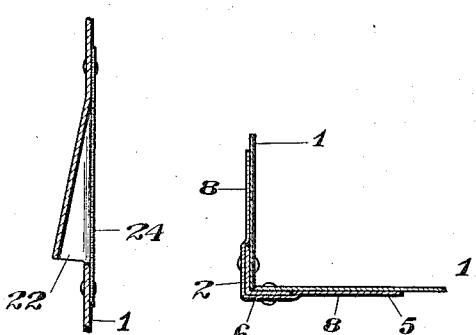
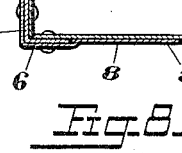
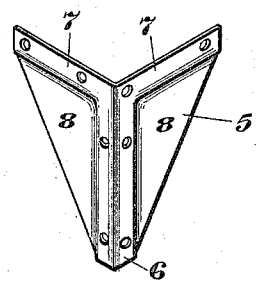
Witness:
Martin Peterson.
Inventor:
Theophilus Brown
by W.C. Jrdiverton
his Attorney.

T. BROWN.
SUPPLY CART.
APPLICATION FILED JULY 28, 1915.
1,163,610.
Patented Dec. 7, 1915.
4 SHEETS—SHEET 4.
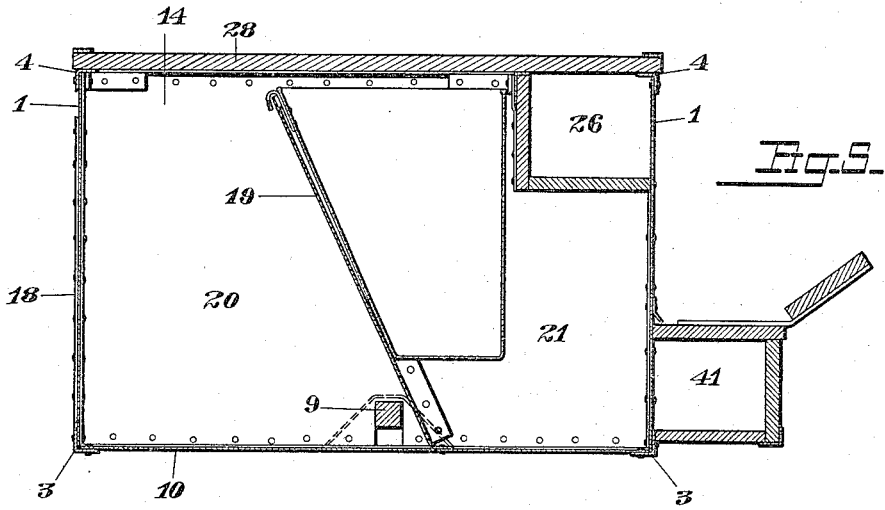
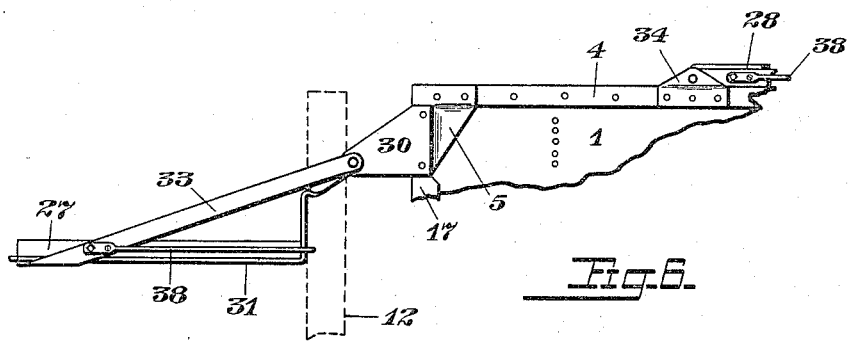

UNITED STATES PATENT OFFICE.

THEOPHILUS BROWN, OF MOLINE, ILLINOIS, ASSIGNOR TO DEERE AND COMPANY, OF MOLINE, ILLINOIS, A CORPORATION OF ILLINOIS.

SUPPLY-CART.

1,163,610.       Specification of Letters Patent.       Patented Dec. 7, 1915.

Application filed July 28, 1915. Serial No. 42,441.

*To all whom it may concern:*

Be it known that I, THEOPHILUS BROWN, a citizen of the United States, residing at Moline, in the county of Rock Island and State of Illinois, have invented certain new and useful Improvements in Supply-Carts, of which the following is a specification, reference being had therein to the accompanying drawing.

My invention relates to supply wagons such as are usually employed in combination with portable or field kitchens forming part of the equipment of an army in the field, or which can be utilized in providing sustenance for other bodies of men gathered for various purposes.

The object of my invention is to provide a cart of compact form embodying facilities for transporting and preparing edibles for cooking, such facilities including conveniences not usually found on vehicles of this class.

Figure 1:
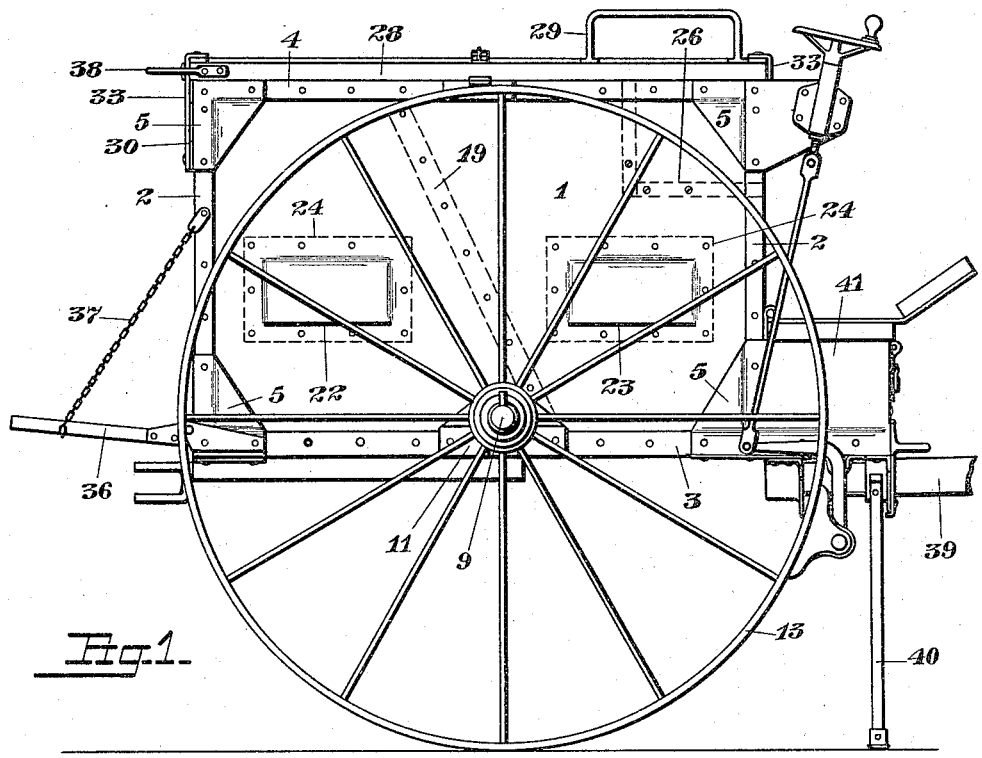
Figure 4:
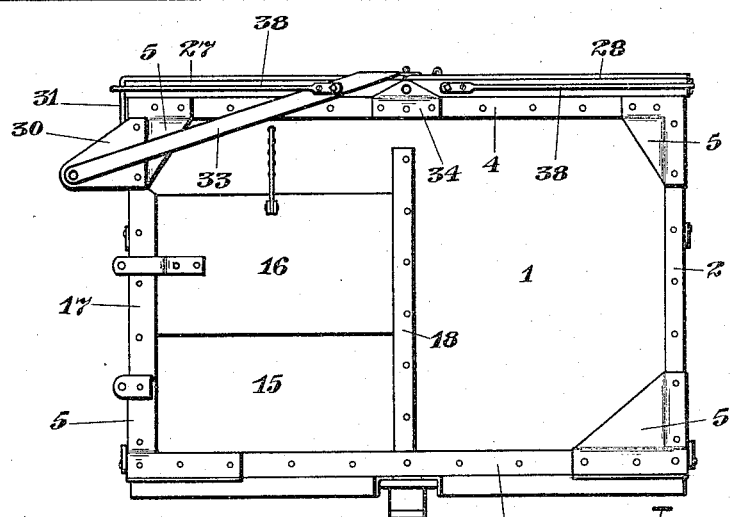

Referring to the drawings in which similar numerals indicate identical parts—Figure 1 is a side elevation of my improved cart. Fig. 2 is a plan view showing the cart open. Fig. 3 is a plan view in part showing the cart closed. Fig. 4 is a rear elevation with the wheels removed. Fig. 5 is a section on the line 5—5 of Fig. 3. Fig. 6 is a rear elevation in part of Fig. 2, and Figs. 7, 8 and 9 are details.

I construct the sides and bottom of the cart body preferably of sheet metal plates 1 which are securely riveted to angle bars 2 forming the corner posts and to angle bars 3 forming the bottom frame; the top frame is formed of similar bars 4. At each corner of the cart body is rigidly secured a member 5 preferably of pressed steel, having a vertical arm 6 and, at right angles thereto, horizontal arms 7, webs 8 connecting said arms and forming therewith a cup to fit snugly to a corner of the cart body where it is rigidly secured preferably by the same rivets that hold the angle bars 2, 3 and 4, and the plates 1 together making a very strong and durable structure.

The cart is mounted on an axle 9 which extends through the cart body above the bottom 10 thereof and through brackets 11 secured to the bottom frame bars 3. Supporting wheels 12 and 13 are journaled on the axle 9. The interior of the cart body is divided by a vertical partition 14 extending longitudinally thereof forming a chamber 15 adapted for storing fuel or material; a sliding door 16, moving between guides 17 and 18 on the rear of the cart body gives ready access to the contents of the chamber 15. The space in the cart body opposite the chamber 15 is divided by a lateral partition 19 which extends forwardly and downwardly dividing the space into approximately equal parts forming chambers 20 and 21 which are ordinarily used for the reception of uncooked edibles in bulk. In the outer wall of the chambers 20 and 21 the metal has been cut and pressed out to form openings 22 and 23 which are covered on the inner side by screens 24 secured to the plate 1, providing sufficient ventilation for the chambers 20 and 21 while excluding flies and rubbish. A box 26 extends the full width of the cart body near the front and top thereof and is adapted for the reception of tools such as knives, ladles, spoons. etc., to be used in preparing the food for cooking.

Folding doors 27 and 28 form the cover for the cart body and a seat for the driver and cooks; hand holds 29 are secured to each door for security of parties on the cart when the latter is in transit. The door 27 is pivotally mounted to be swung over and below the top of the wheel 12 so as to present a table of convenient height when the cart is halted for preparation of food. Brackets 30 are secured to the upper front and rear of the cart body and extend toward the wheel 12. As shown in Fig. 4 the doors 27 and 28 are closed; supporting arms 31 and 32 are secured on the door 27 and are bent downwardly at the outer edge of the door and then outwardly to pivotal connection with the ends of the brackets 30; braces 33 are secured to the ends of the door 27 and extend at an angle to the ends of the brackets 30 to which they are pivotally secured by the bolts or rivets which act as the pivots for the supporting arms 31 and 32, the said braces tending to supporting the weight of the door 27 which normally when open rests against the outer side of the wheel 12.

The door 28 is pivoted to brackets 34, secured centrally to the front and rear upper edge of the cart body, and is adapted to be swung from its position as a cover to the chambers 20 and 21 to form a cover for the chamber 15 so that it forms a table or surface, when the door 27 is open, on which edibles from the chambers 20 and 21 can be prepared and passed to pans or kettles on the door 27.

Pivotally supported on the cart body is a U-shaped rack 35 which, when the doors 27 and 28 are closed, rests within the cart body under the door 28, but when the cart has been halted for the preparation of food, and the door 28 is in position over the chamber 15, the rack 35 can be swung upward and outward over the wheel 13 and supported by the rim of the cart body; in this latter position the rack 35 is adapted for use as a support for ladles and other cooking tools having the handles shaped, as with a hook at the end, to engage with the rack 35. The doors 27 and 28 are preferably made of wood of sufficient thickness to stand the wear occasioned by the preparation of food thereon.

Hinged to the rear lower end of the cart body is a platform 36 supported by chains 37 at each end which are secured to the cart body and to the platform 36 as shown, so that the latter is utilized as a support for an attendant preparing edibles on the door 28 when the latter is over the chamber 15, or others, when the cart body is closed and in transit, may stand upon it for transportation, steadying themselves by hand holds 38 secured on the rear ends of the doors 27 and 28.

A draft pole 39 is secured to the cart and has a prop 40, pivotally mounted on the under side thereof, which is utilized to keep the cart level, or it can be held up out of the way in a well known manner. A box 41 is provided at the front of the cart for storage of repair tools or the like and is adapted as a foot rest for the driver.

I have assembled in a compact form all the necessary equipment for a cart of this description producing a desirable combination of devices that conduce to economy of construction and operation, so that edible materials can be prepared completely for transfer to a cooker.

What I claim is—

1. In a wheeled vehicle of the class described having a body closed at the bottom, doors to close the top of said body, one of said doors adapted to be swung outward to a horizontal position to form a table and the other door adapted to be swung over to the primal position of the first mentioned door.

2. In a wheeled vehicle of the class described having a body closed at the bottom, pivoted doors to close the top of said body, one of said doors adapted to be swung outward and downward outside of a wheel to a horizontal position to form a table, and the other door adapted to be swung over to the primal position of the first mentioned door.

3. In a wheeled vehicle of the class described having a body closed at the bottom, pivoted doors to close the top of said body, one of said doors adapted to be swung outward and downward to a horizontal position outside of a wheel against which it rests to form a table, and the other door adapted to be swung over to the primal position of the first mentioned door.

4. In a wheeled vehicle of the class described having a body closed at the bottom, doors to close the top of said body, one of said doors being pivotally supported at one side of said body to swing outwardly to a horizontal position to form a table, and the other door being pivotally supported centrally of the vehicle body and adapted to be swung over to the primal position of the other door.

5. In a wheeled vehicle of the class described having a body closed at the bottom, a vertical partition extending longitudinally at the approximate center of said body to form two chambers, a door pivotally supported at one side of said body to normally close one chamber and adapted to be swung outwardly to a horizontal position to form a table, and a second door pivotally supported centrally of said body to close the other chamber and adapted to be swung over to the primal position of the first mentioned door when the latter is swung outwardly.

6. In a wheeled vehicle of the class described having a body closed at the bottom, a vertical partition extending longitudinally at the approximate center of said body to form two chambers, a door pivotally supported at one side of said body to normally close one chamber and adapted to be swung outwardly and downwardly below the top of a wheel to a horizontal position to form a table, and a second door pivotally supported centrally of said body adjacent the partition to close the other chamber and adapted to be swung over to the primal position of the first mentioned door when the latter is swung outwardly.

7. In a wheeled vehicle of the class described having a body closed at the bottom, doors pivotally supported on said body to close the top thereof and opening and closing in the same direction, one door adapted to be swung outwardly from a side of said body to form a table, the other door adapted to be swung to the primal position of the first mentioned door, and a rack pivotally supported on said body and normally resting beneath the second mentioned door when said body is closed and adapted to be swung up and outwardly from said body to form a support.

8. In a wheeled vehicle of the class described having a body closed at the bottom, and a top pivoted door adapted to be swung outward and downward to a horizontal position below the plane of the top of said body and resting against the outer face of a wheel to form a table.

9. In a wheeled vehicle of the class described having a body closed at the bottom, and a top pivoted door adapted to be swung outward to a horizontal position and in contact with a wheel to form a table.

In testimony whereof I affix my signature, in presence of two witnesses.

THEOPHILUS BROWN.

Copies of this patent may be obtained for five cents each, by addressing the "Commissioner of Patents, Washington, D. C."